United States Patent
Boyer

(10) Patent No.: US 9,611,028 B2
(45) Date of Patent: Apr. 4, 2017

(54) PRESSURE RELIEF PANEL GUARD

(71) Applicant: William J. Boyer, Lakewood, WA (US)

(72) Inventor: William J. Boyer, Lakewood, WA (US)

( * ) Notice: Subject to any disclaimer, the term of this patent is extended or adjusted under 35 U.S.C. 154(b) by 243 days.

(21) Appl. No.: 14/601,126

(22) Filed: Jan. 20, 2015

(65) Prior Publication Data

US 2015/0225068 A1 Aug. 13, 2015

Related U.S. Application Data

(60) Provisional application No. 61/928,504, filed on Jan. 17, 2014.

(51) Int. Cl.
| | | |
|---|---|---|
| *B64C 1/22* | (2006.01) | |
| *B64C 1/14* | (2006.01) | |
| *B64C 1/18* | (2006.01) | |
| B64C 1/00 | (2006.01) | |

(52) U.S. Cl.
CPC .......... *B64C 1/1446* (2013.01); *B64C 1/1461* (2013.01); *B64C 1/18* (2013.01); *B64C 2001/009* (2013.01)

(58) Field of Classification Search
CPC ....... B64C 1/18; B64C 1/1446; B64C 1/1461; B64C 2001/009
See application file for complete search history.

(56) References Cited

U.S. PATENT DOCUMENTS

| | | | | |
|---|---|---|---|---|
| 4,089,140 | A * | 5/1978 | McIntyre | B64C 1/18 244/117 R |
| 6,367,200 | B1 * | 4/2002 | LaConte | B64C 1/1446 49/318 |
| 8,016,235 | B2 * | 9/2011 | Ramirez Blanco | B64C 1/1446 244/119 |
| 8,839,807 | B2 * | 9/2014 | Kent | F16K 15/023 137/15.19 |
| 9,108,717 | B2 * | 8/2015 | Boyer, Jr. | B64C 1/1415 |
| 9,359,084 | B2 * | 6/2016 | Durand | B64D 43/00 |
| 2015/0061380 | A1 * | 3/2015 | Schomacker | B64C 1/18 307/9.1 |

* cited by examiner

*Primary Examiner* — Philip J Bonzell
*Assistant Examiner* — Michael Kreiner
(74) *Attorney, Agent, or Firm* — George C. Rondeau, Jr.; Davis Wright Tremaine LLP

(57) ABSTRACT

A pressure relief panel guard for use with a pressure relief ceiling panel having a perimeter and positioned in an aircraft cargo bay ceiling. The panel guard including a mounting structure attachable to the cargo bay ceiling, and having a mounting portion and a guard support portion, and a guard structure releasably supported by the guard support portion of the mounting structure. The guard structure having a perimeter wall and a central opening between the perimeter wall sized such that when supported by the guard support portion of the mounting structure at the pressure relief ceiling panel the pressure relief ceiling panel is vertically aligned with the central opening with the perimeter wall extending about the perimeter of the pressure relief ceiling panel and the perimeter wall does not overlap the pressure relief ceiling panel or otherwise restrict operational access to the pressure relief ceiling panel from below.

22 Claims, 2 Drawing Sheets

PRESSURE RELIEF PANEL GUARD

BACKGROUND OF THE INVENTION

Field of the Invention

The present invention is generally related to ceiling pressure relief panels used in cargo bays of jet aircraft, and more particularly to a pressure relief panel guard.

Description of the Related Art

In jet aircraft such as a Boeing 737, there is ceiling panel 12 in the ceiling 14 of the cargo bay 15 (also known as the cargo hold), as shown in FIG. 1. The ceiling panel is both a decompression panel and an access door for a hatch 16 between the main passenger cabin and the cargo bay of the aircraft. It is an essentially flat panel mounted within the hatch generally flush with the interior surface of the cargo bay ceiling. The cargo bay is where luggage and other types of cargo (hereinafter both being referred to as "cargo") are placed for transport with the aircraft. Due to the limited height of the cargo bay, when cargo is being moved around within the cargo bay during loading and unloading of the cargo, there a risk that the cargo will contact and thereby dislodge or damage the ceiling panel. There is also a risk that cargo may shift during flight and contact and thereby dislodge or damage the ceiling panel.

Cargo is never to be stacked against the cargo bay ceiling, but rather there is supposed to be a two inch gap between loaded cargo and the cargo bay ceiling (and hence the ceiling panel) at all times. However, often this requirement is not followed and cargo is stacked high enough to contact the cargo bay ceiling, including the ceiling panel. In addition, if cargo is positioned immediately below the ceiling panel in close proximity with the ceiling panel, such as a suitcase or bag, turbulence encountered by the aircraft during flight can cause the suitcase or bag to be thrown about and contact the ceiling panel.

If contact with the ceiling panel by cargo damages or dislodges the ceiling panel, the panel must be repaired and properly refitted in the cargo bay ceiling at the hatch between the main passenger cabin and the cargo bay of the aircraft.

DETAILED DESCRIPTION OF THE INVENTION

The present invention is a pressure relief panel guard 10. The panel guard 10 is designed to protect the ceiling panel from damage or dislodgement resulting from contact with cargo, with bags and suitcases being the type cargo that frequently causes the problem on commercial passenger airliners carrying baggage.

Figure 1:
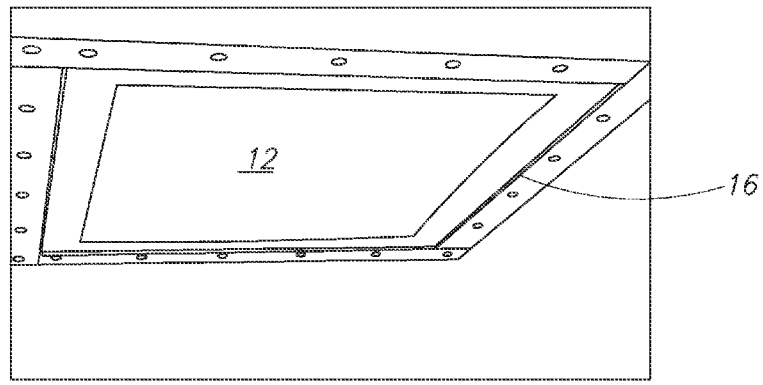
FIG. 1 is perspective view of a prior art ceiling pressure relief panel in a cargo bay of a jet aircraft.
Figure 2:
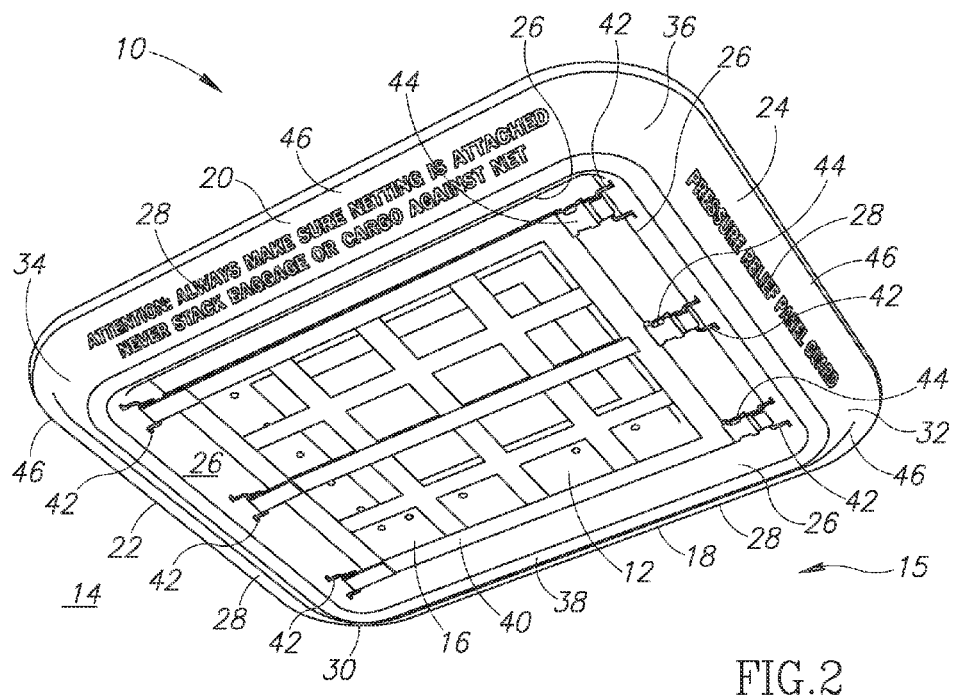
FIG. 2 is a perspective view of a pressure relief panel guard in accordance with an embodiment of the present invention positioned over a ceiling pressure relief panel in the cargo bay of a jet aircraft.

The ceiling panel 12 is generally rectangular in shape and fitted within the hatch flush with the interior surface of the cargo bay ceiling. As shown in FIG. 2, the panel guard 10 has four sides in a rectangular configuration and is sized to extend about the perimeter of the ceiling panel 12, in close proximity with the four edges of the ceiling panel, but without overlapping the ceiling panel so that removal or opening of the ceiling panel is not prevented or inhibited by the panel guard.

The panel guard 10 has opposing first 18 and second 20 elongated side members, and third 22 and fourth 24 elongated opposing side members, with the third and fourth side members being shorter than the first and second side members. Each of the first, second, third and fourth side members have an inward facing wall portion 26 and an outward facing wall portion 28, and first and second end portions. The first side member 18 extends between the first end portions of the third 22 and fourth 24 side members with the first end portion of the first side member rigidly connected to the first end portion of the third side member and forming a first corner portion 30 of the panel guard, and with the second end portion of the first side member rigidly connected to the first end portion of the fourth side member and forming a second corner portion 32 of the panel guard. The second side member 20 is spaced apart from the first side member 18 and extends between the second end portions of the third and fourth side members with the first end portion of the second side member rigidly connected to the second end portion of the third side member and forming a third corner portion 34 of the panel guard, and with the second end portion of the second side member rigidly connected to the second end portion of the fourth side member and forming a fourth corner portion 36 of the panel guard. The first, second, third and fourth corner portions are convexly rounded.

The first, second, third and fourth side members have a height such that when the panel guard is attached to the cargo bay ceiling, the first, second, third and fourth side members each project downward toward the floor of the cargo bay slightly over two inches and terminate at a lower edge portion and together define a generally rectangular perimeter ridge 38 having convexly rounded corner ridge portions. Each of the outwardly facing wall portions of the first, second, third and fourth side members is beveled with a slope extending upward and outward from the corresponding lower edge portion of the perimeter ridge 38. The bevels of the first, second, third and fourth side members tend to deflect any cargo, such as a bag or suitcase moving into contact with the outwardly facing wall portion, in a downward direction away from the ceiling panel 12. Further, the downwardly projecting first, second, third and fourth side members tend to fend off cargo which might move upward toward the ceiling panel as a result of turbulence when the aircraft is in flight.

To provide further protection for the ceiling panel from cargo, the panel guard 10 may include a net 40 which spans between the inward facing wall portions 26 of the first, second, third and fourth side members and is located below the ceiling panel 12 at a sufficient distance spaced apart from the ceiling panel that cargo contacting the net will be stopped from traveling fully toward and contacting the ceiling panel. Preferably, the net extends coextensive with the ceiling panel. To releasable hold the net in position, the inward facing wall portions of the third 22 and fourth 24 side members each have three spaced apart, footman loops 42. The net has end straps at one end that each extend through one of the loops 42 of the third side member 22 to securely retain that end of the net thereto, and the opposite end of the net has quick release clips 44 which releasable secure that end of the net to the loops 42 of the fourth side member 24 and provide for quick release of at least one end of the net from the panel guard so that when desired the ceiling panel can be removed and movement through the hatch is not restricted.

The outward facing wall portions 28 of the first, second, third and fourth side members each have a lip portion 46 projecting laterally outward and located at the base of the panel guard 10 which is positioned toward the ceiling 14 of the cargo bay 15 when the panel guard is attached to the ceiling.

Figure 3:
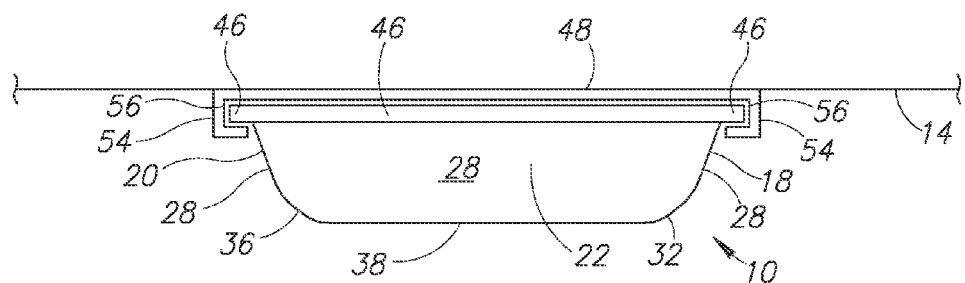
FIG. 3 is an end elevational view of the pressure relief panel guard of FIG. 2 showing a pressure relief panel guard mounting plate.
Figure 4:
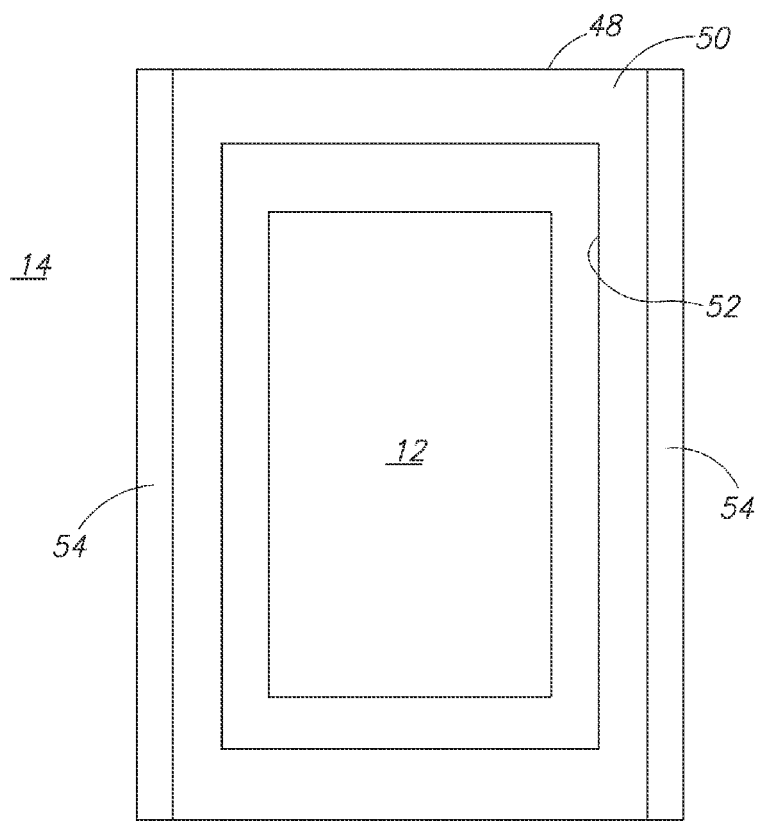
FIG. 4 is bottom plan view of the mounting plate of FIG. 3 with the pressure relief panel guard removed.

As shown in FIGS. 3 and 4, in the illustrated embodiment, the panel guard 10 is removably attached to the ceiling 14 of the cargo bay 15 using a mounting plate 48 having a flat base portion 50 with a central aperture 52 sized larger than the ceiling panel 12 such that when the mounting plate is attached to the ceiling 14, removal or opening of the ceiling panel is not prevented or inhibited by the mounting plate, nor is movement through the hatch when the ceiling panel is removed. The base portion 50 of the mounting plate is attached to the ceiling with an adhesive, or may be attached using rivets, screws, clips or other means of attachment.

The mounting plate 48 includes a pair of elongated C-shaped channel portions 54, each with an inwardly facing opening 56 extending the length of the channel portion and having an end opening at one or both ends thereof. The channel portions are laterally spaced apart such that one channel portion slidably receive therein, through one of the end openings thereof, the lip portion 46 of the first side member 18 and the other slidably receive therein, through one of the end openings thereof, the lip portion 46 of the second side member 20 to accomplish positioning of the panel guard 10 below and generally centered on the ceiling panel. When in position with the first, second, third and fourth side members of the panel guard extending about the ceiling panel, a removable fastener, clip or other means (not shown) is used to secure the panel guard to the mounting plate or to the ceiling to maintain the panel guard in such position during normal usage. It should be understood that alternatively, the mounting plate can be constructed with channel portions to slidably receive the lip portions 46 of the third and fourth side members 22 and 24.

An alternative means of attachment of the panel guard to the ceiling of the cargo bay uses two separate elongated flat channel members (not shown), similar in shape to channel portions 54, attached to the ceiling, with each positioned to an opposite side of the ceiling panel 12 in a position not to restrict removal of the ceiling panel or movement through the hatch when the ceiling panel is removed. The channel members may each have an inwardly facing opening extending the length of the channel member and an end opening at one or both ends thereof, as described above for the channel portions 54, to slidably receive the lip portions 46 of two of the opposite side members of the panel guard. Alternatively, two opposing ones of the first, second, third and fourth side members may each have an underside with a slider portion formed therein sized to fit into the opening of a corresponding one of the channel members and slide therealong, rather than using the lip portions 46 of the panel guard.

The invention claimed is:

1. A pressure relief panel guard for use with a pressure relief ceiling panel having a perimeter and positioned in an aircraft cargo bay ceiling, comprising:
    a mounting structure attachable to the cargo bay ceiling, the mounting structure having a mounting portion and a guard support portion, the mounting structure being configured such that when attached to the cargo bay ceiling at the pressure relief ceiling panel the mounting structure does not overlap the pressure relief ceiling panel or otherwise restrict operational access to the pressure relief ceiling panel from below; and
    a guard structure releasably supported by the guard support portion of the mounting structure, the guard structure having a perimeter wall and a central opening between the perimeter wall sized such that when supported by the guard support portion of the mounting structure at the pressure relief ceiling panel the pressure relief ceiling panel is vertically aligned with the central opening with the perimeter wall extending about the perimeter of the pressure relief ceiling panel and the perimeter wall does not overlap the pressure relief ceiling panel or otherwise restrict operational access to the pressure relief ceiling panel from below, the perimeter wall projecting downward away from the aircraft cargo bay ceiling and terminating below the pressure relief ceiling panel.

2. The pressure relief panel guard of claim 1 wherein the perimeter wall projects downward at least 2 inches.

3. The pressure relief panel guard of claim 1 wherein the perimeter wall includes opposing first and second elongated side members, and third and fourth elongated opposing side members, with the third and fourth side members being shorter in length than the first and second side members.

4. The pressure relief panel guard of claim 3 wherein each of the first, second, third and fourth side members has an inward facing wall portion and an outward facing wall portion, and first and second end portions, with the first side member extending between the first end portions of the third and fourth side members, having the first end portion of the first side member rigidly connected to the first end portion of the third side member and forming a first corner portion of the perimeter wall, and the second end portion of the first side member rigidly connected to the first end portion of the fourth side member and forming a second corner portion of the perimeter wall, and having the second side member spaced apart from the first side member and extending between the second end portions of the third and fourth side members, having the first end portion of the second side member rigidly connected to the second end portion of the third side member and forming a third corner portion of the perimeter wall, and the second end portion of the second side member rigidly connected to the second end portion of the fourth side member and forming a fourth corner portion of the perimeter wall.

5. The pressure relief panel guard of claim 4 wherein each of the first, second, third and fourth corner portions is convexly rounded.

6. The pressure relief panel guard of claim 5 wherein the first, second, third and fourth side members each project downward and terminate at a lower edge portion and together define a generally rectangular perimeter ridge with convexly rounded corner ridge portions.

7. The pressure relief panel guard of claim 4 wherein the first, second, third and fourth side members each project downward and terminate at a lower edge portion and together define a generally rectangular perimeter ridge.

8. The pressure relief panel guard of claim 7 wherein each of the outwardly facing wall portions of the first, second, third and fourth side members is beveled with a slope extending upward and outward from a corresponding one of the lower edge portions of the perimeter ridge.

9. The pressure relief panel guard of claim 1 wherein the perimeter wall includes opposing first and second side members, and third and fourth opposing side members, and further a net spanning between the first, second, third and fourth side members such that when supported by the guard support portion of the mounting structure at the pressure relief ceiling panel the net is spaced downwardly away from the relief ceiling panel.

10. The pressure relief panel guard of claim 9 wherein the net is releasably attached to at least the third and fourth side members.

11. The pressure relief panel guard of claim 1 wherein the perimeter wall includes opposing first and second side members, and third and fourth opposing side members, each having a lip portion projecting laterally outward and located adjacent to the cargo bay ceiling when the guard structure is supported by the guard support portion of the mounting structure at the pressure relief ceiling panel.

12. The pressure relief panel guard of claim 1 wherein the perimeter wall includes at least two opposing connector portions, and the guard support portion of the mounting structure includes a pair of elongated channel portions, each with a laterally facing opening extending the length of the channel portion and having an end opening, each configured to slidably receive one of the opposing connector portions of the perimeter wall therein.

13. A pressure relief panel guard for use with a pressure relief ceiling panel having a perimeter and positioned in an aircraft cargo bay ceiling, comprising:
a guard structure attachable to the cargo bay ceiling, the guard structure having a perimeter wall and a central opening between the perimeter wall sized such that when the guard structure is attached to the cargo bay ceiling at the pressure relief ceiling panel the perimeter wall does not overlap the pressure relief ceiling panel or otherwise restrict operational access to the pressure relief ceiling panel from below, the perimeter wall projecting downward away from the aircraft cargo bay ceiling and terminating below the pressure relief ceiling panel.

14. The pressure relief panel guard of claim 13 wherein the perimeter wall projects downward at least 2 inches.

15. The pressure relief panel guard of claim 13 wherein the guard structure is configured for releasable attachment to the cargo bay ceiling.

16. The pressure relief panel guard of claim 13 wherein the perimeter wall includes opposing first and second elongated side members, and third and fourth elongated opposing side members, each of the first, second, third and fourth side members has an inward facing wall portion and an outward facing wall portion, and first and second end portions, with the first side member extending between the first end portions of the third and fourth side members, having the first end portion of the first side member rigidly connected to the first end portion of the third side member and forming a first corner portion of the perimeter wall, and the second end portion of the first side member rigidly connected to the first end portion of the fourth side member and forming a second corner portion of the perimeter wall, and having the second side member spaced apart from the first side member and extending between the second end portions of the third and fourth side members, having the first end portion of the second side member rigidly connected to the second end portion of the third side member and forming a third corner portion of the perimeter wall, and the second end portion of the second side member rigidly connected to the second end portion of the fourth side member and forming a fourth corner portion of the perimeter wall.

17. The pressure relief panel guard of claim 16 wherein each of the first, second, third and fourth corner portions is convexly rounded.

18. The pressure relief panel guard of claim 17 wherein the first, second, third and fourth side members each project downward and terminate at a lower edge portion and together define a generally rectangular perimeter ridge with convexly rounded corner ridge portions.

19. The pressure relief panel guard of claim 16 wherein the first, second, third and fourth side members each project downward and terminate at a lower edge portion and together define a generally rectangular perimeter ridge.

20. The pressure relief panel guard of claim 19 wherein each of the outwardly facing wall portions of the first, second, third and fourth side members is beveled with a slope extending upward and outward from a corresponding one of the lower edge portions of the perimeter ridge.

21. The pressure relief panel guard of claim 13 wherein the perimeter wall includes opposing first and second side members, and third and fourth opposing side members, and further a net spanning between the first, second, third and fourth side members such that when supported by the guard support portion of the mounting structure at the pressure relief ceiling panel the net is spaced downwardly away from the relief ceiling panel.

22. The pressure relief panel guard of claim 21 wherein the net includes attachment members which are releasably attachable to at least the third and fourth side members.

* * * * *